(12) United States Patent
Jacob D'Cunha

(10) Patent No.: US 6,867,575 B2
(45) Date of Patent: Mar. 15, 2005

(54) SWITCHING MODE POWER SUPPLY INCORPORATING POWER LINE FILTER

(75) Inventor: Allwyn Jacob D'Cunha, Samutprakarn (TH)

(73) Assignees: Delta Electronics, Inc. (TW); Delta Electronics (Thailand) Public Company Limited (TH)

(*) Notice: Subject to any disclaimer, the term of this patent is extended or adjusted under 35 U.S.C. 154(b) by 0 days.

(21) Appl. No.: 10/313,292

(22) Filed: Dec. 6, 2002

(65) Prior Publication Data

US 2004/0109333 A1 Jun. 10, 2004

(51) Int. Cl.[7] .......................... H02N 7/10; H02N 7/122
(52) U.S. Cl. ........................ 323/901; 363/50; 363/44
(58) Field of Search ........................... 323/901, 908; 363/49, 50, 44, 45, 55

(56) References Cited

U.S. PATENT DOCUMENTS

| | | | |
|---|---|---|---|
| 5,179,362 A | | 1/1993 | Okochi et al. |
| 6,181,084 B1 | * | 1/2001 | Lau ............................ 315/291 |
| 6,489,755 B1 | * | 12/2002 | Boudreaux et al. .......... 323/282 |
| 6,538,906 B1 | * | 3/2003 | Ke et al. ................... 363/21.02 |
| 6,577,512 B2 | * | 6/2003 | Tripathi et al. ........... 363/21.17 |
| 6,597,075 B1 | * | 7/2003 | Goodrich, II ................ 307/66 |
| 6,697,269 B2 | * | 2/2004 | Kwon .......................... 363/39 |

* cited by examiner

Primary Examiner—Bao Q. Vu
(74) Attorney, Agent, or Firm—Michael Best & Friedrich LLP

(57) ABSTRACT

There is disclosed a switching mode power supply with a reduced EMI effect, comprising a rectifier for converting an AC power supplied by an AC power source into a rectified DC power, a transformer coupled to the rectifier for inputting the DC power from a primary winding and inducing a rectified power to a secondary winding through the primary winding, a switch unit connected in series with the primary winding for converting the DC power supplied to the primary winding into AC power by on/off operations, an output voltage feedback control circuit for providing pulses to drive the switch unit by controlling a switching duty cycle of the switching unit, and a power line filter including a unidirectional current-limiting device such as a diode for reducing differential mode noise appearing between a live supply line and a neutral line from the alternating current power source.

9 Claims, 3 Drawing Sheets

SWITCHING MODE POWER SUPPLY INCORPORATING POWER LINE FILTER

FIELD OF THE INVENTION

The present invention is generally concerned with a power line filter being incorporated into a switching mode power supply, which functions as an electromagnetic interference (EMI) attenuator that reduces the differential mode noise appearing between a live supply line and a neutral line from a power source. More particularly, the present invention describes a switching mode power supply incorporating a power line filter that can achieve improved EMI performance and obtain better electrical characteristics.

BACKGROUND OF THE INVENTION

It is known for those skilled in the art that all electric system have radiation of one kind or another. Noise is typically an unwanted pest that interferes with clean power supply. There are several types of radiation, wherein the common types are electromagnetic interference (EMI) and radio frequency interference (RFI).

Generally, EMI is caused by the generation of radiation that is induced by the charge difference between three electrical wires from an AC power source, i.e. live (or hot) supply line, neutral line and ground line. EMI noise is classified into two common types. One is common-mode noise, wherein this is the radiation that is caused by the charge difference between live and neutral lines with respect to ground line. Another one is differential mode noise, wherein this is the radiation that is caused by the charge difference between live supply line and neutral line.

EMI has been proved to be an unintentional by-product that can seriously deteriorate the quality factor of power supply device and bring harmful effect to the power supply system. To address these undesired disturbances incurred due to electromagnetic radiation during the period of power transmission, S. Okochi and T. Takoda in their U.S. Pat. No. 5,179,362 describes a power line filter to attenuate the normal mode noise appearing between power lines and common mode noise appearing between a power line and a ground line, which is incorporated herein for reference. The EMI filter disclosed in this example includes a plurality of first inductors interposed between the live supply line and the neutral line, a first X-capacitor interposed between the live supply line and the neutral line on the load side relative to the first inductors, a plurality of second inductors interposed between the live line and the neutral line on the load side relative to the first X-capacitor, and a Y-capacitor interposed between the live line and the ground line as well as between the neutral line and the ground line on the load side relative to the second inductors, wherein the Y-capacitor constituting a common mode filter between the first inductors and the second inductors in response to common mode noise.

Although the EMI filter taught in this prior art reference is well suited for the suppression of EMI noise, the EMI filter given in this prior art reference is encompassed with numerous inductors and capacitors. For a power supply engineer, the use of electronic device having inductive or capacitive characteristic usually indicates high cost and space-consuming issues. If these bulky elements are to be mounted on a circuit board, it is unpractical in space utilization and its economic benefit is greatly downscaled.

It is therefore urged to provide a switching mode power supply including a compact power line filter being implemented in a costless and space-saving way to attenuate the differential mode noise occurring between the live supply line and the neutral line.

SUMMARY OF THE INVENTION

For the purpose of attaining the foregoing objective, the present invention is achieved by providing a switching mode power supply with a reduced EMI. To achieve a switching mode power supply with a reduced EMI, a compact power line filter is disclosed which is incorporated into a switching mode power supply to serve as an EMI filter. The switching mode power supply incorporating a power line filter according to the present invention includes a rectifier for converting an AC power supplied by an AC power source into a rectified DC power, a power transformer coupled to the rectifier for inputting the rectified DC power from a primary winding and inducing a rectified power to a secondary winding through the primary winding, a switch unit connected in series with the primary winding for converting the DC power supplied to the primary winding into AC power by on/off operations, an output voltage feedback control circuit for providing pulses to drive the switching unit by controlling a switching duty cycle of the switch unit, and a power line filter including an unidirectional current-limiting device such as a diode for reducing differential mode noise appearing between a live supply line and a neutral line emerging from the switching circuit of the AC power source.

Now the foregoing and other features and advantages of the present invention will be best understood through the following descriptions with reference to the accompanying drawings, wherein:

DETAILED DESCRIPTION OF THE PREFERRED EMBODIMENT

The present invention is made by the provision of a switching mode power supply including a power filter that is simple in circuit configuration and easy to be controlled to suppress EMI noise resulting from power transmission. A preferred embodiment incorporating the features and advantages of the present invention will be enumerated in following paragraphs of descriptions. It is to be realized that the present invention is allowed to have various modification in different respects, all of which are without departing from the scope of the present invention, and the description herein and the drawings are intended to be taken as illustrative in nature, and are not limitative.

Figure 1:
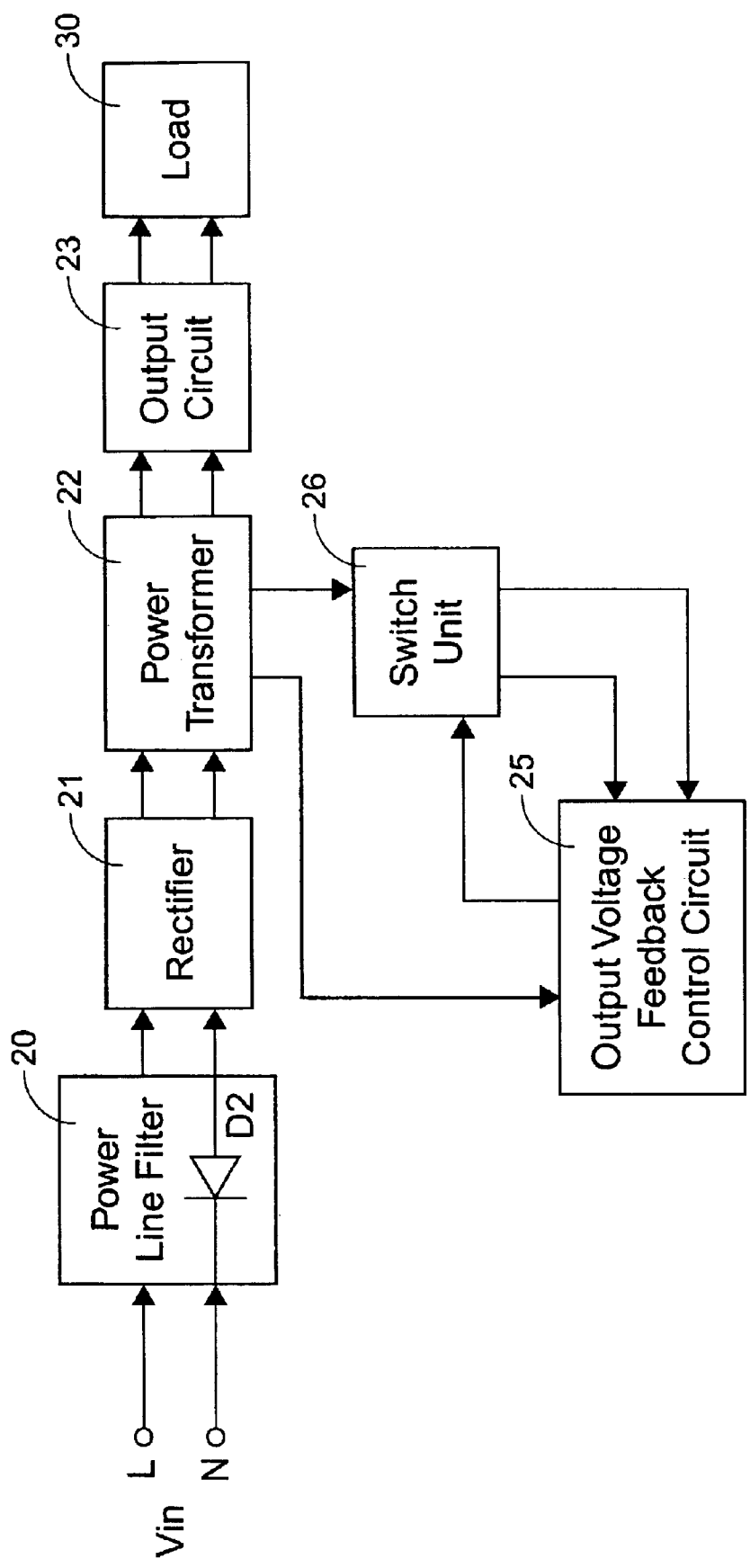
FIG. 1 is a block diagram of a switching mode power supply in accordance with the principle of the present invention.

Referring to FIG. 1, a switching mode power supply according to a preferred embodiment of the present invention is shown. As depicted in FIG. 1, within the switching mode power supply of the present embodiment, a commercially available input alternating current (AC) power Vin supplied through electrical wires extending therefrom, i.e. live supply line and neutral line, is fed into a rectifier 21 including a rectifying diode and a smoothing capacitor (for simplicity, these elements are not intended to be indicated in the drawings, however, it can be readily understood that these elements will suggest themselves to those skilled in the art). The input AC line power Vin is rectified and filtered by the rectifier 21 to be converted into a DC voltage and then supplied to a primary winding (not shown) of a power transformer 22 that induces rectified power to a secondary winding (not shown) through a primary winding to transform the power into the power required by the load 30. Also, a switch unit 26 is connected in series with a primary winding of the power transformer 22, and the DC power supplied to the primary winding of the power transformer 22 is converted into AC power by the switching operation of the switch unit 26, and transmitted to the secondary winding of power transformer 22. The AC power is then converted into DC power by an output circuit 23 and then supplied to a load 30. Further, the output voltage regulation is achieved by an output voltage feedback control circuit 25.

The output voltage feedback control circuit 25 consists of an RC oscillator that spontaneously generates high frequency oscillation signals by means of a self-oscillating converter topology. In the self-oscillating converter, the switching operation of the switch unit 26 is governed by the positive feedback from an auxiliary winding of the power transformer 22. The frequency of the oscillation signals is controlled by a drive clamping action of the output voltage feedback control circuit 25, which responds to an increase in the magnetizing current during "ON" period of the switch unit 26. The amplitude of the oscillation signals at which the magnetizing current is turned off and the input energy is controlled to maintain the output voltage constant and in regulation.

As stated in the preceding paragraphs of descriptions, in order to reduce the annoying noise due to EMI phenomenon in a switching mode power supply, an EMI filter constituted by bulky and costly inductive and capacitive elements is required to be connected between the neutral node of neutral line and the rectifier circuit. If such an EMI filter is to be implemented on a circuit board, a number of disadvantageous factors in circuit design will be readily discovered by a power supply engineer. To cope with the differential mode noise occurring between the live supply line L and the neutral line N in an easy and convenient way, the present invention suggests a compact power line filter 20 for use with switching mode power supply. Turning to FIG. 1, the power line filter 20 in accordance with the present invention is constituted by a unidirectional current-limiting device such as diode D2 connected between a neutral node of the neutral line N and the rectifier 21. The principle of filtering the differential mode noise by means of a unidirectional current-limiting device D2 will be given in the following explanations.

During the positive half-cycle operation of the input AC power Vin, i.e. the voltage potential of the live supply line L is positive with respect to that of the neutral line N, both the rectifying diode in the rectifier circuit 21 and diode D2 are forward-biased, and thus powering up the switching mode power supply. During the negative half-cycle operation of the input AC power Vin, i.e. the voltage potential of the live supply line L is negative with respect to that of the neutral line N, both the rectifying diode in the rectifier circuit 21 and diode D2 are reverse-biased, and thus no current is flowing through diode D2. However, since diode D2 is reversed biased, the current that comes from the power supply is blocked at the anode of diode D2, and thus current is prohibited from feeding into the neutral line. In this manner, the differential mode noise can be maintained at a minimum value and EMI effect can be significantly suppressed.

Figure 2A:
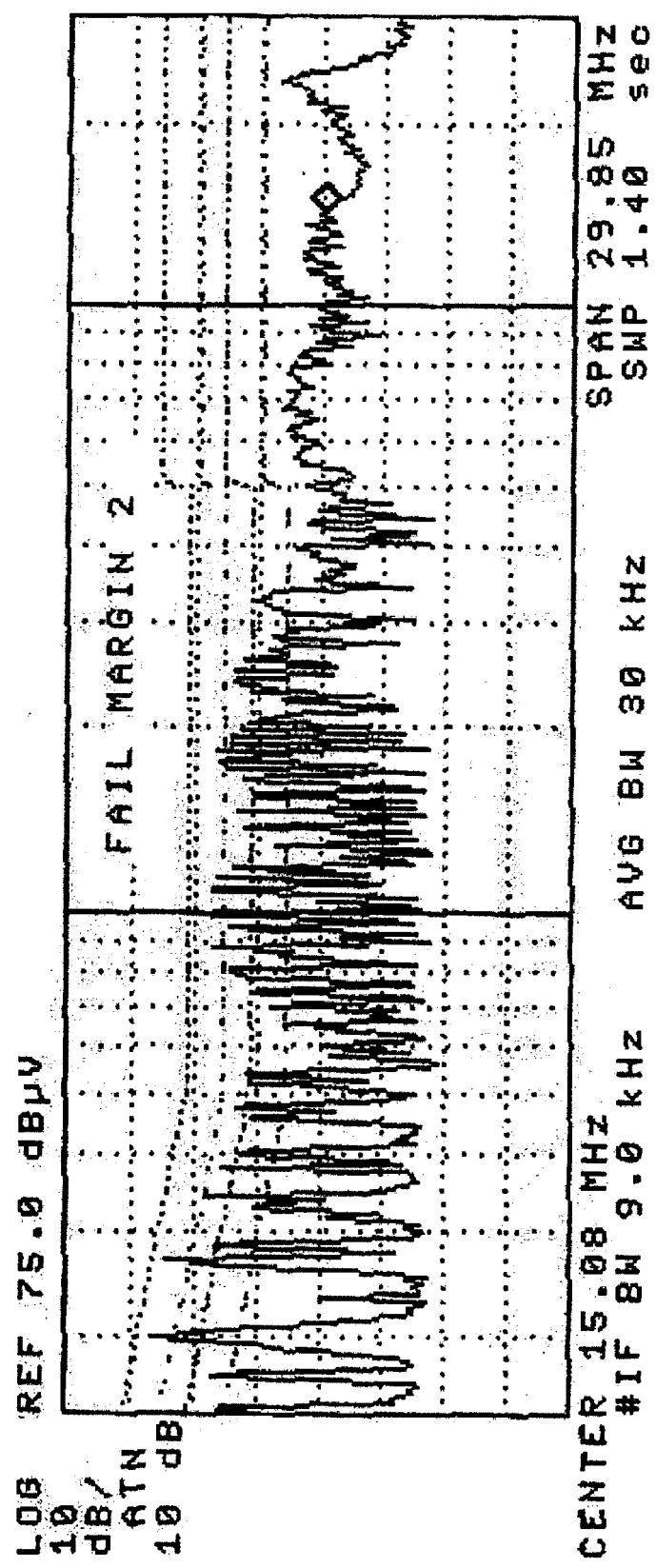
FIG. 2(a) is an EMI test curve diagram of a switching mode power supply without the use of the power line filter in accordance with the present invention.
Figure 2B:
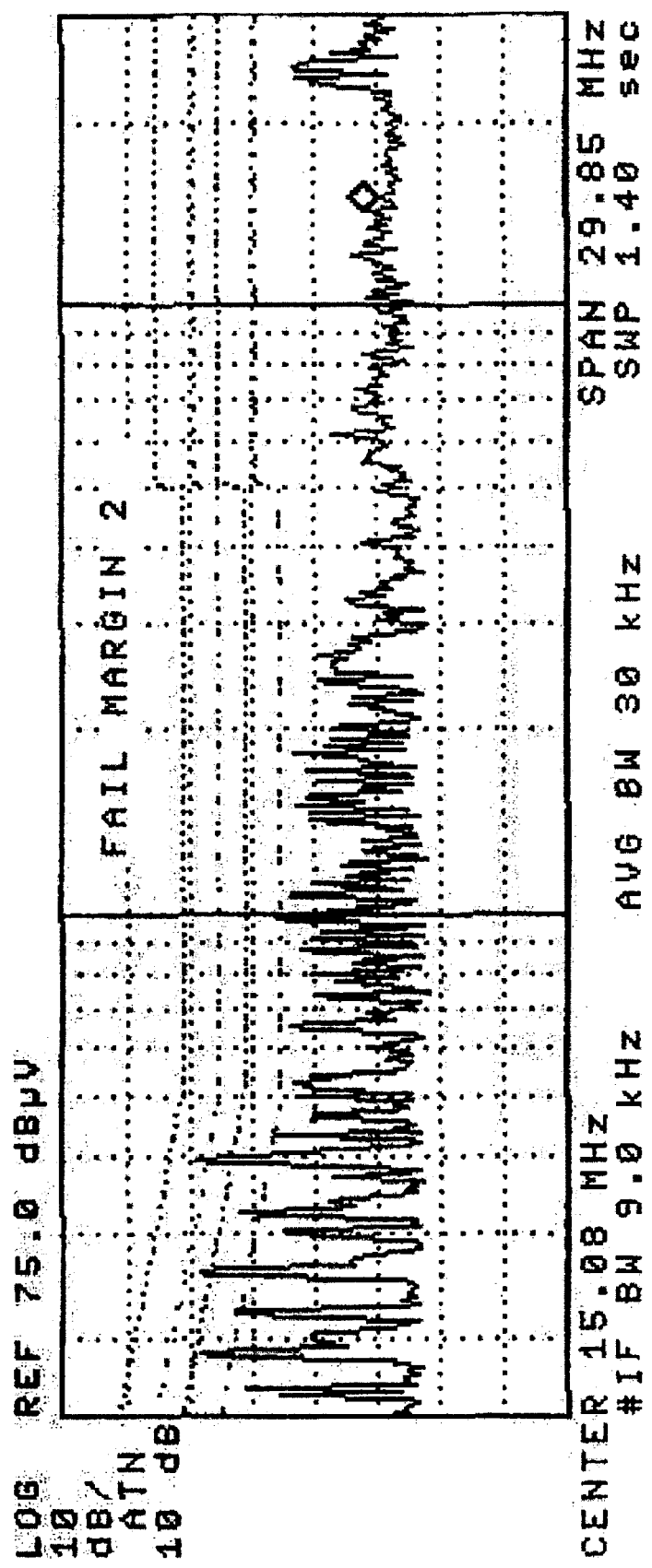
FIG. 2(b) is an EMI test curve diagram of a switching mode power supply with the power line filter being incorporated therein in accordance with the present invention.

In order to further illustrate the advantages of the present invention in the respect of attenuation of differential mode noise, turning to FIGS. 2(*a*) and 2(*b*), which respectively show the EMI test curve diagram without the use of power line filter and with the power line filter of the present invention to be used with the switching mode power supply according to the present invention. Observing these two EMI test diagrams, it is obvious that in case the diode D2 is not operatively connected between the neutral node of the neutral line N and the input of rectifier circuit, the EMI performance of the switching mode power supply will get worse by approximately 5 dBs compared to the case that diode D2 is operatively connected between the neutral node and the input of rectifier circuit. It can be easily understood that the power line filter including a unidirectional current-limiting device is competent to reduce differential mode noise appearing between the live supply line and the neutral line, while its circuit configuration is extremely simple and its fashion of operation is quite straightforward.

It is to be appreciated from the above statements that the present invention is embodied in a power line filter (or EMI filter) being constructed in a configuration by disposing a diode between a neutral node of a neutral line N and an input of a rectifier circuit. This serially-connected diode which function as a unidirectional current-limiting device is capable of limiting the current from flowing into the neutral line from the input AC power source Vin during the negative half-cycle operation of the input AC power Vin. With the power line filter in accordance with the present invention, differential mode noise can be kept as low as possible and the quality of power transmission of a power supply is promoted to a higher degree.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A power supply device comprising:
   a rectifier for converting an alternating current power supplied by an alternating current power source into a rectified direct current power;
   a power transformer coupled to the rectifier for inputting the rectified direct current power from a primary winding and inducing a rectified power to a secondary winding through the primary winding;
   a switch unit connected in series with the primary winding for converting the direct current power supplied to the primary winding into alternating current power by on/off operations; and
   a power line filter including a directional current-conducting device for reducing a differential mode noise appearing between a live supply line and a neutral line from the alternating current power source.

2. The power supply device according to claim 1 further comprising an output circuit coupled to the secondary winding of the transformer for providing an output voltage for a load.

3. The power supply device according to claim 2 further comprising an output voltage feedback control circuit for providing pulses to drive the switch unit.

4. The power supply device according to claim 3 wherein the output voltage feedback control circuit further comprises an oscillation circuit for generating a high frequency oscillation signal to serve as a switch control signal for the switch unit.

5. The power supply device according to claim 1 wherein the directional current-conducting device is a unidirectional electronic device.

6. The power supply device according to claim 5 wherein the unidirectional electronic device is a diode.

7. A power supply device, comprising:
- a rectifier for converting an alternating current power supplied by an alternating current power source into a rectified direct current power;
- a transformer coupled to the rectifier for inputting the rectified direct current power from a primary winding and inducing a rectified power to a secondary winding through the primary winding;
- a switch unit connected in series with the primary winding for converting the direct current power supplied to the primary winding into alternating current power by on/off operations;
- an output circuit coupled to the secondary winding for providing an output voltage for a load;
- an output voltage feedback control circuit coupled to the power transformer and the switch unit for maintaining the output voltage at a predetermined value by regulating a switching duty cycle of the switch unit; and
- a power line filter including a unidirectional current-conducting device for reducing a differential mode noise appearing between a live supply line and a neutral line extending from the alternating current power source.

8. The power supply device according to claim 7 wherein the output voltage feedback control circuit further comprises an oscillation circuit for generating a high frequency oscillation signal to serve as a switch control signal for the switch unit.

9. The power supply device according to claim 7 wherein the unidirectional current-conducting device is a diode.

* * * * *